United States Patent
Prasad

(10) Patent No.: US 8,027,679 B2
(45) Date of Patent: Sep. 27, 2011

(54) SECURE INTRA- AND INTER-DOMAIN HANDOVER

(75) Inventor: Anand R. Prasad, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 1240 days.

(21) Appl. No.: 10/571,644

(22) PCT Filed: Jan. 23, 2004

(86) PCT No.: PCT/EP2004/000562
§ 371 (c)(1),
(2), (4) Date: Mar. 13, 2006

(87) PCT Pub. No.: WO2005/027560
PCT Pub. Date: Mar. 24, 2005

(65) Prior Publication Data
US 2007/0064647 A1    Mar. 22, 2007

(30) Foreign Application Priority Data

Sep. 12, 2003  (EP) .................. PCT/EP2003/010183
Sep. 12, 2003  (EP) .................. PCT/EP2003/010184
Sep. 12, 2003  (EP) .................. PCT/EP2003/010185

(51) Int. Cl.
*H04W 36/00* (2009.01)
(52) U.S. Cl. ........ 455/436; 455/410; 455/411; 455/437; 455/438; 455/439; 370/328; 370/330; 370/331; 370/338
(58) Field of Classification Search .......... 455/436–444, 455/410, 411; 370/331, 338, 328, 329, 330, 370/332; 380/247–250, 270, 277–285; 713/152, 156, 168, 169, 173, 182, 184
See application file for complete search history.

(56) References Cited

U.S. PATENT DOCUMENTS

| | | | | |
|---|---|---|---|---|
| 6,418,130 | B1 * | 7/2002 | Cheng et al. ................. | 370/331 |
| 6,823,461 | B2 * | 11/2004 | Narayanan et al. ............ | 726/13 |
| 6,990,343 | B2 * | 1/2006 | Lefkowitz ..................... | 455/436 |
| 7,107,051 | B1 * | 9/2006 | Walker ......................... | 455/432.1 |
| 7,263,357 | B2 * | 8/2007 | Lee et al. ..................... | 455/432.1 |

(Continued)

FOREIGN PATENT DOCUMENTS

EP    0 818 938 A    1/1998

(Continued)

OTHER PUBLICATIONS

"EAP Key Management Framework", EAP Working Group, 'Online!, Aug. 2003, p. 1-45, XP002287958, Retrieved from the Internet: retrived on Jul. 9, 2004.

(Continued)

*Primary Examiner* — Olumide T Ajibade Akonai
(74) *Attorney, Agent, or Firm* — Nutter McClennen & Fish LLP; John J. Penny, Jr.; Christina M. Sperry

(57) ABSTRACT

To achieve a secure and fast handover in a distributed mobile communication environment (10), the control functionality is lying at the borderline between wireless and wire-bound communication network elements, and it is proposed to, firstly, execute a mutual authentication between a mobile device (26) and a new access point (14) using security context information previously transmitted to the new access point. Then, after successful mutual authentication, a handover will be executed from the current access point (12) to the new access point (14).

8 Claims, 8 Drawing Sheets

U.S. PATENT DOCUMENTS

| | | | | |
|---|---|---|---|---|
| 7,266,100 | B2* | 9/2007 | Le et al. | 370/331 |
| 7,350,077 | B2* | 3/2008 | Meier et al. | 713/171 |
| 7,366,152 | B2* | 4/2008 | O'Neill et al. | 370/338 |
| 7,373,508 | B1* | 5/2008 | Meier et al. | 713/168 |
| 7,388,851 | B2* | 6/2008 | Trossen | 370/331 |
| 2002/0169958 | A1* | 11/2002 | Nyman et al. | 713/168 |
| 2002/0197979 | A1* | 12/2002 | Vanderveen | 455/410 |
| 2003/0092444 | A1 | 5/2003 | Sengodan et al. | |
| 2003/0103496 | A1 | 6/2003 | Narayanan | |
| 2003/0119508 | A1 | 6/2003 | Takeshita et al. | |
| 2003/0214922 | A1* | 11/2003 | Shahrier | 370/331 |
| 2004/0103282 | A1* | 5/2004 | Meier et al. | 713/171 |

FOREIGN PATENT DOCUMENTS

| | | |
|---|---|---|
| EP | 1 111 872 A | 6/2001 |
| WO | WO-01/20938 A | 3/2001 |
| WO | WO-03/003639 A | 1/2003 |
| WO | WO-2005/027557 | 3/2005 |

OTHER PUBLICATIONS

"Draft Recommended Practice for Multi-Vendor Access Point Interoperability Via an Inter-Access Point Protocol across distribution systems supporting IEE 802.11 operation" IEEE P802.11F/D5, XX, XX, Jan. 2003, pp. 1-83, XP002275579, p. 1, line 7-line 33.

Bernard Aboba: "A Model for Context Transfer in IEEE 802" Network Working Group—Internet Draft, 'Online! Apr. 6, 2002, pp. 01-16, XP002288528 Retrived from the Internet: 'retrived on Jul. 14, 2004! abstract.

Blumenthal U et al: "A Scheme for Authentication and Dynamic Key Exchange in Wireless Networks" Bell Labs Technology, Bell Laboratories, Murrey Hill, NJ, US, vol. 2, No. 7, 2002, pp. 37-48, XP001141703, ISSN: 1089-7089.

P. McCann: "Mobile Ipv6 Fast handovers for 802.11 Networks" Internet, 'Online!, Oct. 2002, pp. 01-14, XP002288527, Retrived from the Internet on Jul. 14, 2004.

"Universal Mobile Telecommunications System (UMTS); 3G security; Security architecture (3GPP TS 33.102 version 5.2.0 Release 5); ETSI TS 133 102" ETSI Standards. European Telecommunications Standards Institute, Sophia-Antipo, FR, vol. 3-SA3, No. V520, Jun. 2003, XP014010201, ISSN: 0000-0001.

IEEE 802.11i, "Wireless LAN Medium Acess Control (MAC) and Physical Layer (PHY) specifications Amendment 6: Medium Access Control (MAC) Security Enhancements", IEEE Std 802.11i, Jul. 23, 2004.

N. Cam-Winger et al., "Security Flaws", Communications of the ACM, May 2003, vol. 46, No. 5.

IEEE Handoff, http://www.ieee802.org/21/.

IEEE LinkSec, http://grouper.ieee.org/groups/802/linksec//.

3GPP Technical Specification 33.102, "3G Security; Security Architecture," V5.1.0, Dec. 2002.

Hasan, J. Jahnert, S. Zander, and B. Stiller, "Authentication, Authorization, Accounting, and Charging for the Mobile Internet", TIK-Report Nr. 114, version 1, Jun. 2001.

H. Wang, and A.R. Prasad, "Security Context Transfer in Vertical Handover", in Proc. of the 14th International Symposium on Personal, Indoor, Mobile Radio Communication (PIMRC 2003), Beijing, China, Sep. 2003.

Oyoqui, J.M. et al: "Context transfer for seamless micro-mobility", IEEE International Conference on Computer Science, Sep. 8, 2003, pp. 291-297.

Prehofer, C. et al.: "A framework for context-aware handover decisions", IEEE International Symposium, vol. 2, Sep. 7, 2003, pp. 2794-2798.

Cappiello, M. et al: "Mobility amongst heterogeneous networks with AAA support", ICC 2002, 2002 IEEE International Conference on Communications. Conference Proceedings, New York, NY, Apr. 28-May 2, 2002, IEEE International Conference on Communications, New York, NY: IEEE, US, vol. 1 of 5, Apr. 28, 2002, pp. 2064-2069.

WECA, http://www.weca.net.

Roaming Operations (ROAMOPS), http://www.ietf.org/proceedings/97dec/97dec-final-79.htm.

Pahalavan, K. et al., "Handoff in hybrid mobile data networks," IEEE Pers. Comm., Apr. 2000, pp. 34-47.

Koodli, R. et al: "Fast Handovers and Context Transfers in Mobile Networks" Computer Communication Review, Association for Computing Machinery, New York, US, vol. 31, No. 5, Oct. 2001, pp. 37-47.

"Handover requirement between UTRAN and GERAN or other radio systems—TS 22.129 releave V5.2.0" 3GPP TS 22.129 V5.2.0, XX, XX, Jun. 2002, pp. 1-22.

Kempf, J. "RFC 3374 Problem Description: Reasons for performing context transfers between nodes in an IP access network" Network Working Group, Sep. 2002.

Invitation to Pay Additional Fees including Communication Relating to the Results of the Partial International Search mailed Jul. 21, 2004 in PCT International Application PCT/EP03/10183.

International Search Report mailed Jul. 23, 2004 in PCT International Application PCT/EP03/10184.

International Search Report mailed Jul. 27, 2004 in PCT International Application PCT/EP03/10185.

International Preliminary Report on Patentability mailed Dec. 30, 2005 in PCT International Application PCT/EP2004/000562.

International Search Report mailed Aug. 2, 2004 in PCT International Application PCT/EP2004/000562.

3GPP, http://www.3gpp.org.

Koodli R, Computer Communication Review, U.S.A., Association for Somputing Machinery, Oct. 2001, V31, N5, 99. 37-47, 3GPP TS 22.129V5.2.0, Jun. 2002, 99. 1-22.

English Translation of Japanese Office Action cited in JP Applicaiton No. 2005-508865, Mailed Feb. 20, 2009.

English Translation of Japanese Office Action cited in JP Applicaiton No. 2005-508865, Mailed Sep. 1, 2009.

3GPP TS 22.129 V5. 2.0, Jun. 2002, pp. 1-22.

* cited by examiner

SECURE INTRA- AND INTER-DOMAIN HANDOVER

Applicant hereby claims priority from PCT/EP2004/000562 filed on Jan. 23, 2004, PCT/EP2003/010183 filed on Sep. 12, 2003, PCT/EP2003/010184 filed on Sep. 12, 2003, and PCT/EP2003/010185 filed on Sep. 12, 2003, priority, which are hereby incorporated by reference in their entirety.

The present invention relates to a method of handover in a distributed mobile communication environment, and in particular to a secure intra- and inter-domain handover for a distributed mobile communication environment.

BACKGROUND ART

Future generation mobile communication networks will have a control intelligence distributed to the edge between wireless and wireline infrastructure elements. Thus, distribution of intelligence to the edge of the mobile communication environment will be referred to as distributed mobile communication environment in the following. While in the following reference will be made to specific examples of such distributed mobile communication environments, it should be clear that any type of distributed mobile communication environment, e.g., GSM, UMTS/EMT2000, PDC, AMPS, DAMPS, IF-95, WLAN, . . . , and any hybrid form thereof, is well considered as covered by the technical teachings to be explained in the following.

Today, problems arise, e.g., for intra-domain handover, i.e. a handover between access points and/or base stations of the same mobile communication environment. In particular, existing solutions do not allow for a fast and at the same time authenticated handover between a first network access point and a second network access point in support of a fast, secure, and seamless handover. Actually, this is a big problem for future generation mobile communications using distributed networks.

An existing solution is known from IEEE 802.11f, IEEE, Draft Recommended Practice for Multi-Vendor Access Point Interoperability via an Inter-Access Point Protocol Across Distribution Systems Supporting IEEE 802.11 Operation, IEEE 802.11f, January 2003, which provides a solution for fast handover within a single domain of a mobile communication environment using context information and caching of context information at access points. Typically, access points are in a so-called neighbourhood relation graph of a currently activated access point AP, also referred to as multicast domain of the current access point. While this standard provides a solution for secure transfer of context information to a new access point, it does nevertheless not define what a context information should actually contain. Further, the standard IEEE 802.11f does not define how mutual authentication should take place at the new access point.

Further, the standard IEEE 802.11i, Medium Access Control Security Enhancements, IEEE 802.11i, September 2003, discusses a solution for pre-authentication, however, without support of fast handover. The pre-authentication is basically achieved by a mobile station roaming in the mobile communication environment using a key in a cache to identify itself to a current access point. Here, the current access point checks with the old access point. The key is derived from a master key which is stored with an authentication server, also referred to AAA server, and the mobile device. The authentication server sends a derived authentication key to an access point.

While fast handover security is under consideration in IEEE 802.11i, there is nothing decided yet. While a keying mechanism and fast handover solution are proposed, the described approach is used for the authentication server for roaming, see N. Cam-Winget et al., Keying for Fast Roaming, IEEE 802.11-02/241r2, May 2003. The authentication server derives a roaming key for each access point and sends it to the access point, and the mobile device also derives the roaming key and therefore the two can authenticate each other. Therefore, the approach described in IEEE 802.11i is certainly not suitable for fast roaming, in particular when there is a lot of traffic in the backbone network and the access server is located far away from the access point or equivalently hotspot. Still further, this standard IEEE 802.11i does not discuss about context transfer.

In conclusion, the approaches proposed by IEEE bodies are still at preliminary stages, and nothing is defined on fast handover. Also security issues during handover are mainly left aside, while IEEE LinkSec http://grouper.ieee.orq/groups/802/linksec// is working towards a common security solution for IEEE devices. Here, the attention is mainly towards wired communication.

Therefore, what is also missing is a solution for inter-domain handover, i.e. handover between distributed wireless communication environments operated by different stakeholders and a solution for efficient re-authentication during handover.

The same also applies to 3G standardization proposals. According to 3GPP Technical Specification 33.102, 3Gsecurity; Security Architecture, V5.1.0, December 2002. There is proposed a procedure of context transfer in UMTS and GSM wireless communication networks. However, what is not discussed is the issue of sending context information with different stakeholders and technologies spread out over different wireless communication networks.

Another proposal, B. Aboba, and T. Moore, A Model for Context Transfer in IEEE 802, Internet Draft, expired, draft-aboba-802-context-02.txt, April 2002, and IETF Seamoby W G: http://www.ietf.org/html.charters/seamoby-charter.html, is related to IETF Seamoby WG and working towards seamless mobility solutions. Here, the draft on context transfer requirements <draft-ietf-seamoby-ct-reqs-o5.txt> has a requirement which states that context information transfer should be based on priority. However, it is not discussed how to prioritize context information. Further, <draft-ietf-seamoby-ctp-reqs-o1.txt> defines a context information transfer protocol for the IP layer. Nevertheless, this protocol does not relate to distributed mobile communication environment and inter-domain handover and it does also not discuss issues related to re-authentication and mutual authentication during handover, in particular with respect to different stakeholders.

Yet another proposal is IST Moby Dick aiming at solutions for fast and seamless handover between different access technologies. Here, most of the proposed handover technologies do not focus on security issues while at the same time aiming at providing fast handover, Hasan, J. Jähnert, S. Zander, and B. Stiller, Authentication, Authorization, Accounting, and Charging for the Mobile Internet, TIK-Report No. 114, version 1, June 2001.

Yet another approach to handover between heterogeneous mobile communication environments has been discussed in H. Wang, and A. R. Prasad, Security Context Transfer in Vertical Handover, in Proc. Of the 14$^{th}$ International Symposium on Personal, Indoor, Mobile Radio Communication (PIMRC 2003), Beijing, China, September 2003, but also this approach does not discuss fast and simultaneously secured handover for a distributed mobile communication environment in the sense outlined in the following.

SUMMARY OF INVENTION

In view of the above, the object of the present invention is to achieve a secure and fast handover in a distributed mobile communication environment.

According to the present invention, this object is achieved through a method of secure handover in a distributed mobile communication environment. The secure handover is executed for a mobile device between a current access device and a new access device. Firstly, there is executed a mutual authentication between the mobile device and the new access device using security context information pre-established at the new access device. When the mutual authentication is successful, only then a handover is executed from the current access device to the new access device.

Therefore, according to the present invention, it is possible to fulfil all requirements for secure and fast handover and only slight modifications to existing solutions are necessary, assuming that context information transfer is available prior to handover.

Further, through the mutual authentication between the mobile device and the new access device it is possible to improve quality of services QoS conditions during handover.

Still further, incorporation of a re-authentication into handover mechanism requires only minimal changes to existing standards, which means fast deployment options and increased customer satisfaction through related improved quality of services QoS levels.

In other words, according to the present invention, it is possible to provide a secure and seamless handover, as mutual authentication relies on security context information which is forwarded to the new access point in the mobile communication environment prior to initiation of a handover between the current access point and the new access point.

Further, an important advantage of the present invention is that it is not restricted to handover within a single communication domain, also referred to as intra-domain handover, but may also be applied to handover between different communication domains, also referred to as inter-domain handover in the following.

Therefore, only the present invention allows for a fast and secure handover for an intra-/inter-domain handover scenario in mobile communication networks, where intelligence, i.e. handover control related functionality, is provided at the borderline between wireless and wireline bounded communication within the environment.

According to a preferred embodiment of the present invention, secure handover is executed between access devices of a same communication domain, i.e. as an intra-domain handover.

Here, it is proposed to have different security keys also referred to as authentication values in the following. A first such key is a master key which is generated during log-on of the mobile device at an authentication server. This master key or master secret authentication value is then passed to different access points.

Preferably, the different access points and the authentication server have a secure connection and log-in takes place on the basis of a mutual authentication between the mobile device and the related access point.

According to the present invention, it is proposed that the access device and the mobile device derive a communication key for communication between the access point and the mobile device and further a third, so-called roaming key.

According to the present invention, it is for the first time proposed to use a roaming key, preferably generated from the master key, and used during any type of handover for mutual re-authentication between the mobile device and new access devices.

Also, according to the present invention, it is proposed to use the communication key, preferably generated from the master key, which may be used for encryption of communication between the access point/base station of the mobile communication environment and the mobile station. Here, different communication keys may be used for uplink and downlink, i.e. for encryption and decryption.

Further, it should be emphasized that the present invention is not restricted to a particular type of encryption algorithm, e.g., DIS, AIS, etc., of key generation methods, e.g., TKIP, MBMS, etc., and/or of authentication methods, e.g., hache function-based authentication methods.

According to yet another preferred embodiment, it is proposed that at least one of the different encryption keys is assigned a renewal time period thereto. The actual length of the time period can be based on best time for key renewal depending on encryption algorithms. One such example would be to base the key renewal time on a packet numbering limit, e.g., 32 bits would then lead to a key renewal after $2^{32}$ data packets. The purpose of this would be to prevent integrity-related issues to arise. Yet another solution would be to either use a time stamp alone, or to use a time stamp in combination with a limit on the number of packets transmitted before key renewal. Yet another option would be to base key renewal on the length of an integrity vector, if used.

According to yet another preferred embodiment of the present invention, it is proposed to maintain a neighbourhood relation for each access device, either in the intra-domain or across different communication domains for inter-domain handover, so as to identify potential new access devices for handover.

The advantage of maintaining a neighbourhood relation is that it allows to easily pre-establish a security-related context at all those access points identified in the neighbourhood relation at any time which is appropriate for security context transfer without being bound to the time of handover.

According to yet another preferred embodiment of the present invention, being related to intra-domain handover, i.e. to handover between different communication domains, it is proposed to basically divide the handover into two different phases.

The first phase is related to preparation of handover, i.e. to establishing a trusted communication between an authentication server in the current communication domain and the related authentication server and access devices in the new communication domains, further to extend the multi-cast domain seen from the first communication domain with potential new access devices in the new communication domain, further to establish a trusted relationship between access devices in the current communication domain and authentication servers in the new communication domain, etc.

Subsequent hereto, the implementation of the actual handover relies on, again, the re-authentication and the execution of the handover, when the re-authentication is successful.

According to yet another preferred embodiment being related to a handover across communication domain boundaries is related to the preparation of the mobile device to get started in the new communication domain.

In particular, according to this preferred embodiment, it is proposed to download security information, in addition to the security context information forward to access points in the new communication domain, which security information allows for the mobile device to start initial communication processes in the new communication domain.

Typically, the security information may comprise at least an identification of the second communication domain, optionally an IP address of a foreign agent in the second communication domain, an communication key for starting communication in the new communication domain, assuming that a related communication domain is forwarded from the current communication domain, an indication of an encryption algorithm to be used in the second communication domain, which is preferable when the first and the second communication domain use different encryption algorithms, so that the mobile device can immediately start using appropriate encryption also in the second communication domain.

The benefit of this preferred embodiment is that mobile devices need not rely on provision of security-related information from an access device in the second communication domain to start communication in this new second communication domain.

According to yet another preferred embodiment of the present invention, it is proposed that a time out period assigned to a communication and a roaming key in the first communication domain may be extended through appropriate devices in the second communication domain.

The advantage of this preferred embodiment is that the extension of time out periods through control devices and the second communication domain allows to maintain handover-related information exchange until related security-related encryption keys are generated and/or available in the second communication domain and the security-related encryption key as provided by the first communication domain are no longer necessary.

Also, according to a preferred embodiment of the present invention, the resumption of communication, either in the intra- or the inter-domain handover case, may be achieved using the security-related encryption key, if a related communication-related key is not available or no longer valid.

In other words, the present invention allows to use different types of encryption keys also for communication to increase flexibility and operability of the overall system even during handover.

According to another preferred embodiment of the present invention there is provided a computer program product directly loadable into the internal memory of an access device and/or a mobile device comprising software code portions for performing the inventive process steps as outlined above when the product is run on a processor of the access device and/or the mobile device.

Therefore, the present invention is also provided to achieve an implementation of the inventive method steps on computer or processor systems. In conclusion, such implementation leads to the provision of computer program products for use with a computer system or more specifically a processor comprised in e.g., an access device and/or a mobile device of a distributed mobile communication environment.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or the Internet and/or telephone networks via modems or other interface devices. It should be understood that such media, when carrying processor readable instructions implementing the inventive concept represent alternate embodiments of the present invention.

BRIEF DESCRIPTION OF DRAWING

In the following, the best mode and preferred embodiments of the present invention will be described with reference to the drawings; in which.

DESCRIPTION OF BEST MODE AND PREFERRED EMBODIMENTS OF THE INVENTION

In the following, through reference to the enclosed drawing, the best mode and preferred embodiment of the present invention will be described. Insofar as related functionality is described with respect to structural diagrams or flowcharts, it should be noted that the person skilled in the art readily appreciates that any such type of functionality may be either implemented in software, in hardware, and/or using any combination thereof.

Further, insofar as reference is made to a mobile communication environment, the person skilled in the art will readily appreciate that there is not imposed any particular restriction of the type of mobile communication environment. Therefore, mobile communication environment in the sense of the present invention is to be understood in its broader sense, irrespective of the underlying technology, e.g., mobile communication telephony, mobile communication data services, wireless local area networks, wireless Internet access, wireless satellite communication systems, wireless communication environments in combination with wire-bound communication environment, etc., either taken alone or in any hybrid form thereof. Typical such examples would be GSM, UMTS/ IMT2000, PDC, AMPS, D-AMPS, IS-95, WLAN, preferably IEEE 802.11 series.

Still further, access devices in the sense of the present invention are to be understood as any type of access points provided at the current network boundary of wireless communication environments, e.g., typically base stations or access points in wireless local area networks.

Still further, mobile devices are to be understood as any type of mobile devices having data exchange capabilities, e.g., mobile telephones, PDA with wireless access, laptop computers, pages, wireless devices using circuit-switched or packet-switched connections, etc.

Basic Handover Procedure

Figure 1:
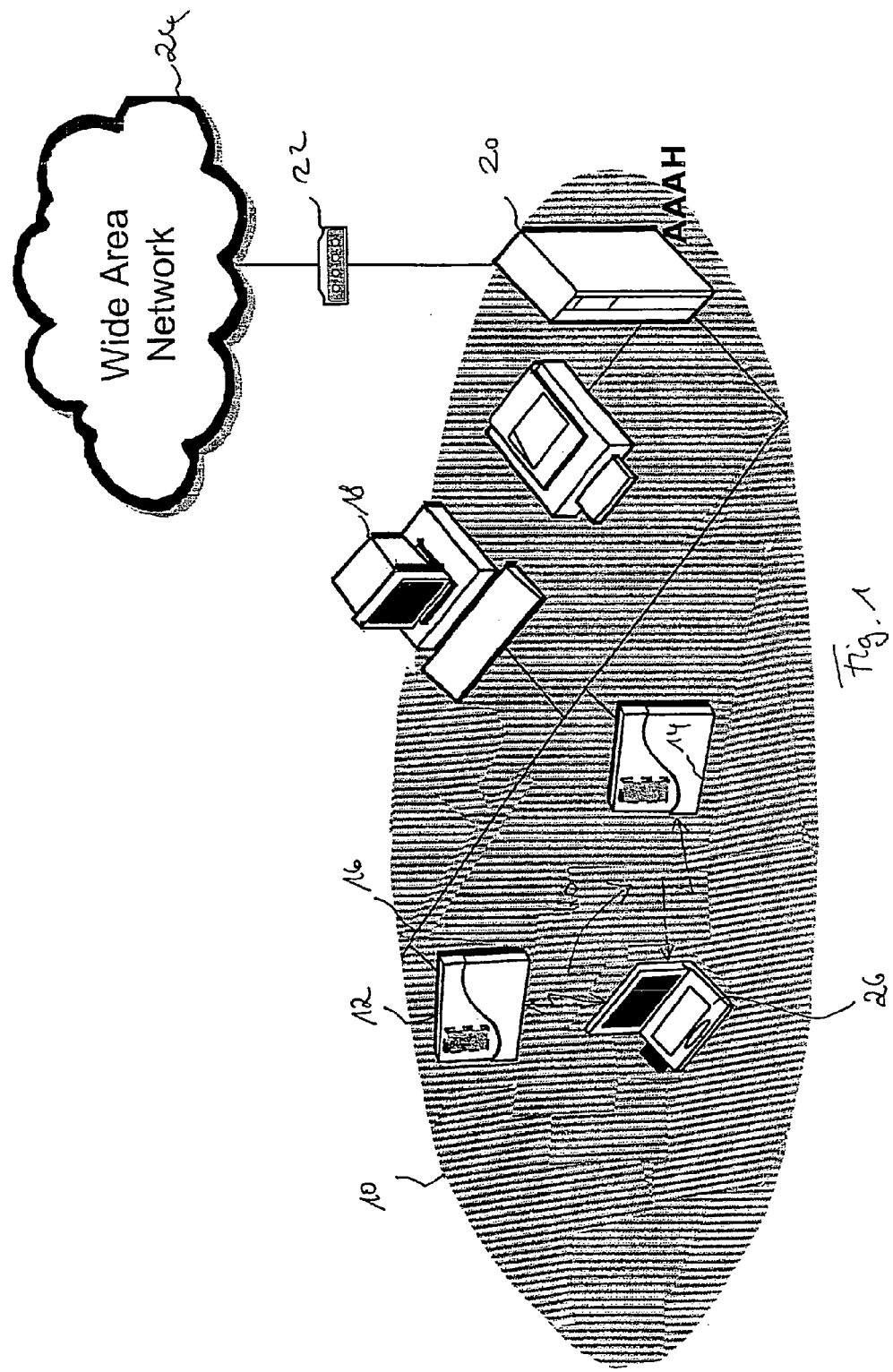
FIG. 1 shows an overview on a typical example of intra-domain handover according to the present invention.

FIG. 1 shows an overview diagram illustrating a typical example of secure handover in a distributed communication environment according to the present invention. In particular, this example is related to a so-called intra-domain handover, wherein handover is achieved between different access points of the same communication domain.

As shown in FIG. 1, generally, a communication domain 10 is of the distributed type, wherein control logic, e.g., with respect to handover, is distributed to devices lying at the borderline between wireless and wire-bound communication, i.e. the access point and the access point 14.

As shown in FIG. 1, without loss of general applicability of the present invention, one may assume that at least the different access points 12, 14 are connected through a backbone network 16, e.g., a local area network.

Further, to the same backbone network 16 there may be attached further computing devices, e.g., a personal computer 18. Also, within a wireless communication environment there should be provided an authentication server 20 for log-on of mobile users.

As shown in FIG. 1, the authentication server may be, e.g., an authentication server according to the IEEE 802.11 series or, in other words, be of the AAA type.

Still further, the mobile communication environment may be hooked onto, e.g., via the authentication server and a router 22 to a wide area network 24 for further data exchange with a communication environment lying outside the mobile communication environment 10.

As also shown in FIG. 1, within the mobile distributed communication environment 10, a mobile device 26 may initially have a wireless connection to the access point 12, which may then, during movement of the mobile device, change to a wireless communication to the access point 14. It is this change of wireless connection from a first access point to a second access point 14, which will be referred to as handover in the following.

Further, handover may not only be achieved between access points of a single communication domain, but also between access points of different communication domains, as will be explained in more detail in the following.

Figure 2:
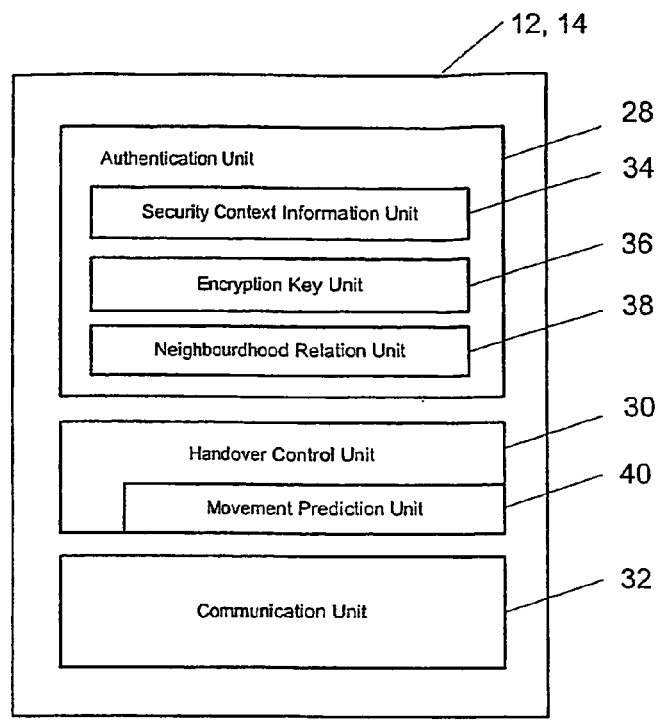
FIG. 2 shows a schematic diagram of an access device according to the present invention.

FIG. 2 shows a schematic diagram of the access points 12, 14 shown in FIG. 1.

As shown in FIG. 2, each access point has an authentication unit 28, a handover control unit 30, and a communication unit 32. Further, the authentication unit 28 may comprise a security context information unit 34, an encryption key unit 36, and a neighbourhood relation unit 38. Optionally, the handover control unit 30 may comprise a movement prediction unit.

Subject to further details to be discussed in the following, the functionality of the authentication unit 28 is related to all kinds of security-related data exchange and processing between the mobile station 26 and the access points 12, 14. This may be related to processing of so-called security context information in the security context information unit 34, to generation of encryption keys in the encryption key unit 36, and to set-up and maintenance and storage of data representing a neighbourhood relation between different access points for identification of handover candidates in the neighbourhood relation unit 38.

Further, the handover control unit 30 operatively achieves all kinds of functionality necessary to achieve a handover between different access points and, optionally, a prediction of movement for identification of a potential new access point for handover.

Still further, the communication unit 32 operatively achieves all types of data exchange between the access point and the mobile station on the one hand and the access point and all further network elements of the mobile communication environment 10, e.g., as shown in FIG. 1.

Figure 3:
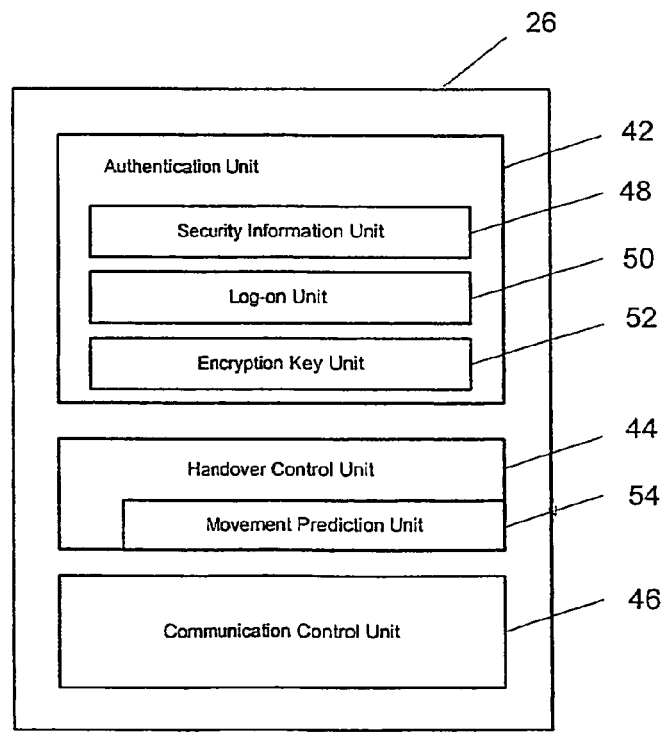
FIG. 3 shows a schematic diagram of a mobile device according to the present invention.

FIG. 3 shows a schematic diagram of the mobile station 26 or any other type of mobile stations executing handover according to the present invention, although not shown in FIG. 1.

As shown in FIG. 3, the mobile station 26 comprises an authentication unit 42, a handover control unit 44, and a communication control unit 46. It should be noted that these different units are functional counterparts to the related units in the access points.

Therefore, the authentication unit 42 in the mobile station 26 comprises an implementation unit for security-related functionality. A first such unit is the security information unit 48 adapted to store and process information regarding security-related issue, in particular when the mobile station roams to a new communication domain. Further, a log-in unit 50 operatively achieves log-in related functionality, in particular with an authentication server provided in each mobile communication environment. Still further, an encryption key unit 52 serves to either generate or process and use different encryption keys for ciphering communication between the mobile station 26 and related access points 12, 14.

Still further, operatively, the handover control unit 44 achieves all control functionality requested at the mobile station side during handover. Optionally, the handover control unit may comprise a movement prediction unit 54 to predict a next access point for handover of the mobile station.

Still further, the communication unit 46 of the mobile station 26 achieves all functionality required for exchange of any type of communication between the mobile station 26 and the access point 12, 14, in particular, communication with respect to payload data and communication with respect to control data, e.g., handover and security-related information in the sense of the invention as outlined in the following.

Further, without restricting scope of the present invention, in the following it may be assumed that the following conditions are fulfilled before start of handover:

Communication between network elements is secure, e.g., for IEEE 802.11 WLANs it is assumed that an inter-access point protocol provides secure communication between access points;

log-in and/or initial authentication of the mobile station/ user is secure;

the authentication server 26 and the network element through which the mobile station authenticates itself or equivalently logs on having secure connection, e.g., via the backbone network 16; further the inter-access point protocol also provides a secure connection between an authentication server at the different access points;

authentication servers of different communication domains or different mobile wireless communication environments have a trust relation; and the networks themselves are service providers or a service is provided by a third party content provider which has a trust relation with the currently used mobile communication environment/network.

Figure 4:
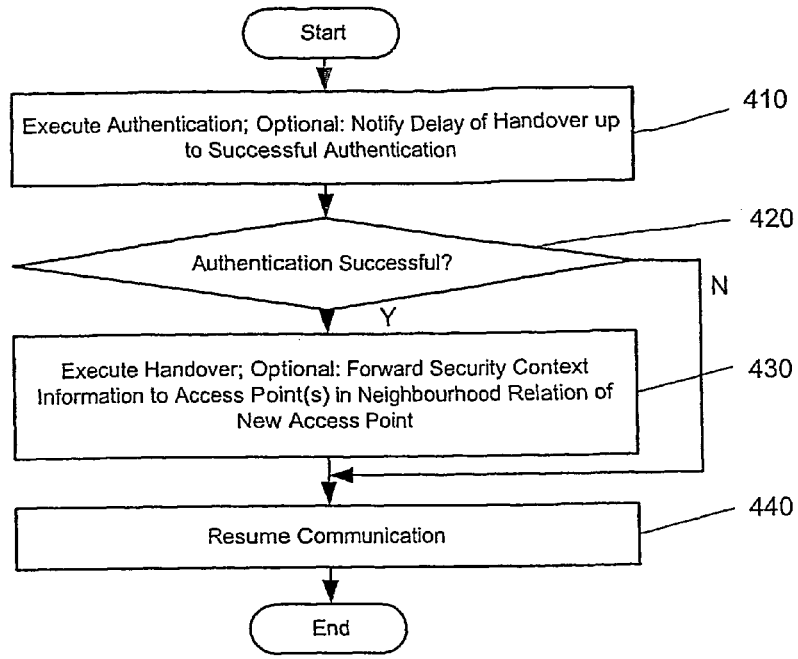
FIG. 4 shows a flowchart of operation for secure handover in a distributed mobile communication environment according to the present invention.

FIG. 4 shows a flowchart of operation for a secure handover in a distributed mobile communication environment according to the present invention.

As shown in FIG. 4, in an operation 410, initially there is executed authentication and, optionally, network elements are notified to delay handover up to successful authentication. Here, the authentication is executed at a new access point.

Then, in an operation 420, the success of the authentication process is evaluated. If the authentication has been successful in an operation 430, the handover procedure is executed. Optionally, security context information, to be explained in more detail in the following, is forwarded and updated at access point(s) according to a neighbourhood relation for the new access point.

Otherwise, if the authentication has not been successful, the process proceeds to operation 440 to resume communication with the previous access point. Otherwise, if authentication and handover are executed successfully, communication will be resumed between the new access point and the mobile station according to operation 440.

Here, it should be noted that the operation of mutual authentication 410 may be executed either at the mobile station, a current access station, a new access station or any network element in the mobile communication environment. In other words, authentication may either be achieved at a dedicated single device or distributed over the mobile communication environment.

Further, optionally in operation 410 any of the devices being involved in executing the handover are notified to delay handover until successful authentication has indeed been confirmed. Heretofore, the mutual authentication between the mobile station and the new access point must be both finished and successful.

Further, as shown in FIG. 4, the operation of resuming communication 440 is executed after authentication handover, according to the present invention for use of so-called security context information. As will be explained in the following, it is the use of this security context information which is transferred to the new access point prior to handover that allows, firstly, through pre establishment to speed up the function of communication and, secondly, through availability of the second access point, to increase security of handover.

To increase flexibility of handover, therefore this security context information may not only be provided at a target access point for handover, but at a plurality of potential handover access identified in the neighbourhood relation for the currently activated access point, either within the current communication domain or across communication domain boundaries for inter-domain handover to be explained in the following.

Main Mechanism—IntraDomain

A typical application scenario with respect to FIG. 1 is the execution of handover between access device of the same mobile communication environment.

Figure 5:
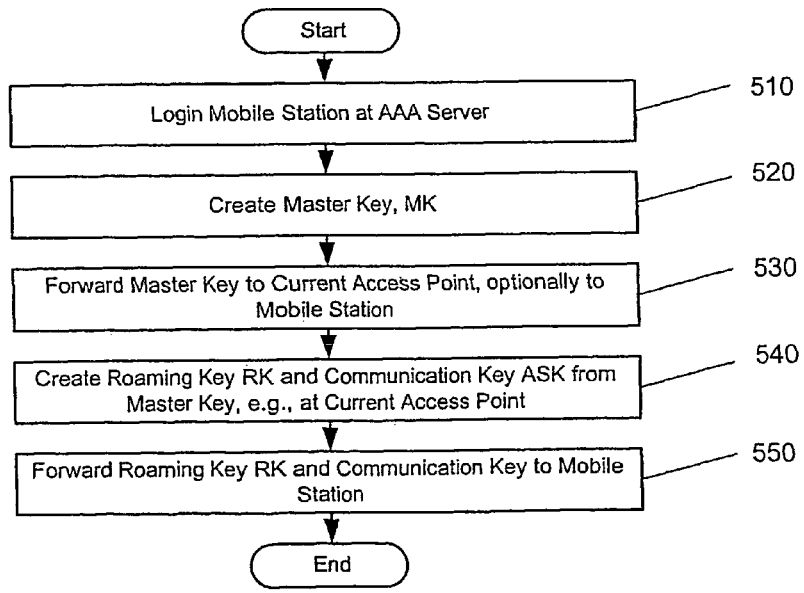
FIG. 5 shows a flowchart of operation in preparing for secure handover in a distributed mobile communication environment according to the present invention.

Heretofore, FIG. 5 shows a flowchart of operation for preparing for such a handover.

As shown in FIG. 5, in operation 510 a user/mobile station will log in to a mobile communication network. During this log-in procedure, in operation 510 it is verified at the authentication server that the user is authorized to execute communication within the mobile communication environment.

Then follows operation 520 to generate a master key MK. One typical example underlying generation of such a master key would be the application of a Diffie-Hellman method using two public values which may be, e.g., sent by any one of the mobile station or any other network device in the mobile communication environment. Further, it should be noted that the application of the Diffie-Hellman method may clearly be considered as only an example and is non-binding for the scope of the present invention.

Irrespective of the method applied for derivation of the master key in operation 520, the master key may either be derived at the authentication server, be derived between an access point and the authentication server, or derived between an access point and the mobile device, whatever is considered appropriate.

As shown in FIG. 5, in an operation 530 the generated master key will then be forwarded to the currently activated access point, and optionally also to the mobile station.

As shown in FIG. 5, the generated master key serves as basis for creation of a so-called roaming key RK and a communication key ASK, operation 540, for protection of communication between the mobile station and the current access point. In other words, the access in the mobile station derives a so-called communication key ASK which is used for secure communication between the access point and the mobile station. Further, from the master key there is also provided a roaming key that is used during handover from one access point to another. Derivation of the communication key ASK and the roaming key RK from the master key MK can be done using, without restricting scope of the invention, any of several known methods in the literature including TKIP being used by WPA and IEEE 802.11i.

As shown in FIG. 5, in an operation 550 the generated roaming key and communication key will then be forwarded to those devices using these keys during subsequent communication handover, in particular to the mobile station.

Security Context Information—IntraDomain

As outlined above, an important aspect of the present invention relates to the generation of security context information in support of secure handover.

According to the present invention, this security context information will be exchanged at least between a current access point and a new access point prior to preparing handover and comprises at least one element of:
a master key MK;
a roaming key RK for mutual authentication between the mobile device and the new access point;
a communication key ASK for mutual communication between the mobile station and the current and/or new access point;
an indication of type of encryption being used by the mobile station;
a time out period for the master key TO-MK;
a time out period TO-ASK for the communication key;
a time out period TO-RK for the roaming key;
a time out period TO-CI for the security context information itself;
a time stamp;

an identification of the current access station; and an identification of the mobile device, which may be a temporary identification.

According to the present invention, the following relation should hold between different time out periods: time out period TO-CI for the security context information should be larger than or equal to the time out period for the master key TO-MK, which should be larger than or equal to the time out period TO-ASK for the communication key, which again should be larger than or equal to the time out period TO-RK for the roaming key.

Typically, the different time out periods serve as upper time limits for update of those values being provided in relation thereto, e.g., such that the communication key would be updated prior to expiry of the related time out period. The same would apply to the roaming key, the master key, or the security context information.

Besides the trigger of update of different encryption keys and context security information through expiry of a time out period, another possibility is that, e.g., the roaming key or the communication key are derived at the current access point and sent to the new access point during handover.

A third possibility is that, e.g., the communication key is derived by the mobile station and a current and/or new access point every time the mobile station performs handover. Still further, use of a hybrid form of update according to the above-referenced three possibilities may be considered.

When using the time out periods, a first option would be to update the related communication keys upon expiry of the time out period. Otherwise, i.e. when sending to the new access point or deriving during handover, it is possible that the handover occurs without the current access point knowing about it, when the mobile station decides to perform handover without informing the current access point. Then, the new communication key must be generated at the new access point.

As outline above, further to the encryption keys, the access point may create security context information for the mobile station and send it to its neighbourhood, in particular to access points identified in a neighbourhood relation graph according to, e.g., an inter-access point communication protocol, e.g., the IAPP according to IEEE 802.11f. Here, the graph is either dynamically changed through members of the graph, or a static graph may also be created by the network administrator, when the location of the access point is not changed.

For spreading the security context information, a first case would be uni-cast case where the security context information is sent from one access point to another, only, or otherwise a multi-cast case, where the security context information is sent from one access point to a plurality of potential handover access points identified in the neighbourhood relation graph. For the uni-cast case, a prediction may be made, based on location, speed, direction, etc., of the mobile station currently hooked up to the current access point and desiring a handover to a new access point. Optionally, the security context information may be sent during the handover process itself or after handover has taken place.

In view of the above, the proposed solution for intra-domain handover according to the present invention relies on the sub-stages start-up of access point, log-on of mobile station with the authentication server, creation of security-related encryption keys, and execution of handover in the sense outlined above.

As an example, the access point switch-on process and log-on to the authentication server under the WLAN standards might lead to the creation of IPSec tunnels, and one to one and one too many secure association under the IP protocol may exist from the current access point to access points considered for subsequent handover.

Further, prior to execution of handover, the encryption method should be decided during log-on to the authentication server. Assuming this to done, several different possibilities for executing the intra-domain handover according to the present invention, which are considered as examples only, may be given as follows.

IntraDomain Handover—Case

Figure 6:
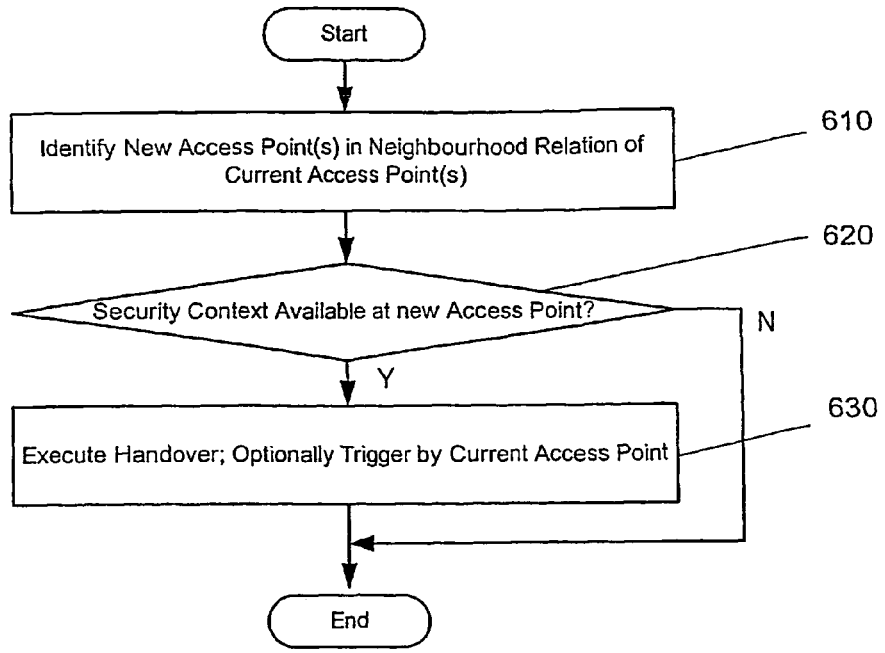
FIG. 6 shows a flowchart of operation for a first type of intra-domain handover according to the present invention.

FIG. 6 shows a flowchart of operation for a first example of intra-domain handover according to the present invention.

Basically, the handover example shown in FIG. 6 relates to a handover to an access point in the same communication domain, where the new access point is identified in the neighbourhood relation graph. This means that security context information is transferred to the access points in the neighbourhood relation graph before execution of handover.

Further, the conditions for handover are that the handover is performed either with the mobile station informing the current access point of the new access point or with the current access point, judging from mobile station communication quality, etc., informing the mobile station of a new access point.

Still further, the mobile station would perform handover only after all the communication between the current and the new access point regarding exchange of handover-related information, e.g., security context information, is completed.

Assuming the conditions to be fulfilled, in an operation 610 there is identified at least one new access point in the neighbourhood relation in the current access point.

Then, in an operation 620 the availability of the security context at the new access point is evaluated.

If such security context is available, then the current access point will inform the mobile station about execution of handover, and optionally trigger the handover procedure, operation 630, which then follows the basic scheme outlined in FIG. 4.

IntraDomain Handover—Case II

A further example again relates to a handover to an access point in the current communication domain, where the new access point is identified in a neighbourhood relation graph of the current access point. Differently to the example shown and illustrated with respect to FIG. 6, here, it will be assumed that the condition for handover is that the mobile station informs about handover without informing the current access point.

Figure 7:
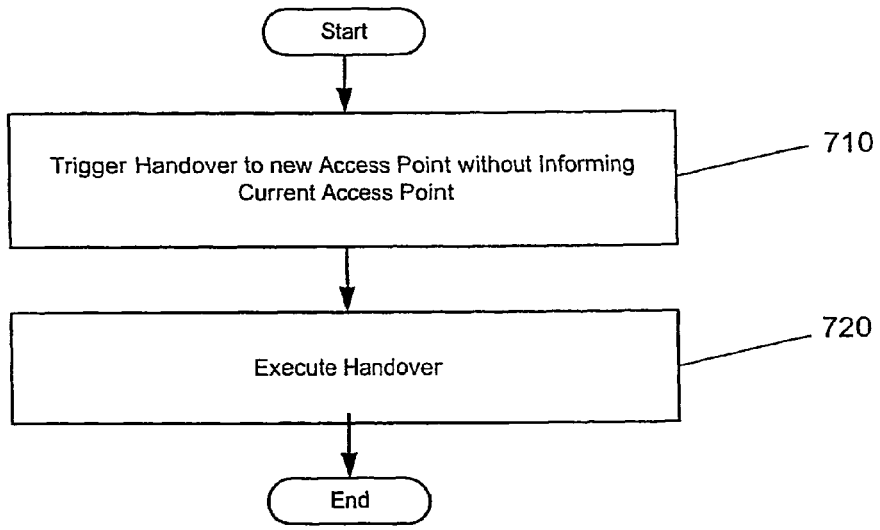
FIG. 7 shows a flowchart of operation for a second type of intra-domain handover according to the present invention.

As shown in FIG. 7, this is achieved in an operation 710. Following the triggering of handover through the mobile station, then there is executed a handover procedure in an operation 720 according to the basic scheme outlined in FIG. 4.

IntraDomain Handover—Case III

A further case of intra-domain handover, i.e. of handover to an access point in the same communication domain relates to a case where the new access point is not identified in the neighbourhood relation graph of the current access station, i.e., where the security context information is not transferred to execution of handover.

Here, conditions for handover are that the handover is performed either with the mobile station informing the current access point of the new access point or with the current access point, judging from mobile station communication quality, etc., informing the mobile station of the new access point. The mobile station will perform handover only after all the communication between the current access point and the new access point regarding security-related information exchange is completed.

Figure 8:
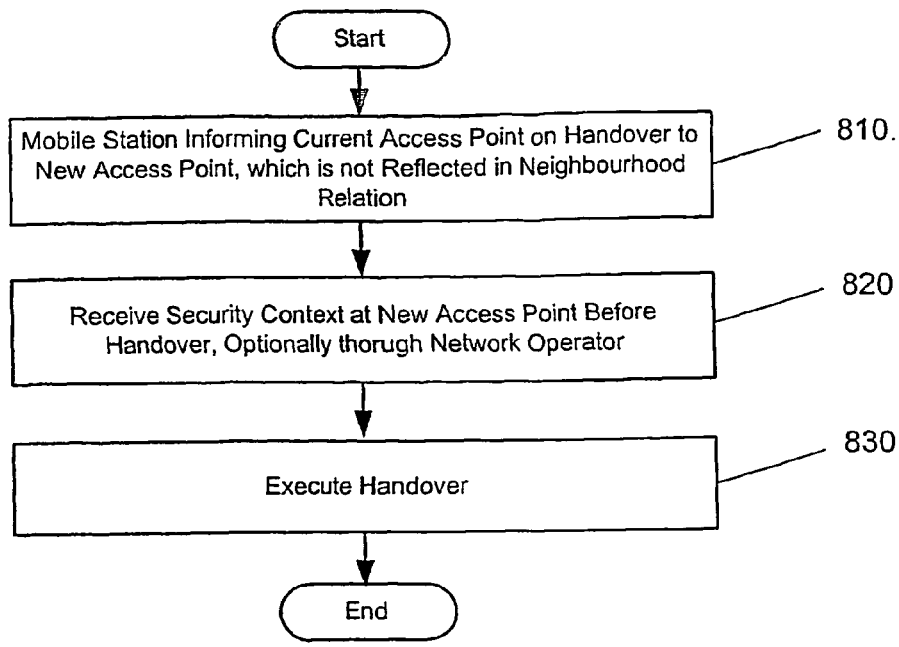
FIG. 8 shows a flowchart of operation for a third type of intra-domain handover according to the present invention.

FIG. 8 shows a flowchart of operation for secure handover according to this third type of intra-domain handover.

As shown in FIG. 8, in an operation 810 a mobile station may inform the current access point on handover to the new access, or otherwise the current access point may inform the mobile station on the same handover. Here, in operation 810 it is assumed that the new access point is not reflected in the neighbourhood relationship of the current point.

As shown in FIG. 8, then in an operation 820 there is received security context information at the new access point before execution of handover, optionally through mediation of a network operator.

As shown in FIG. 8, finally handover is executed in an operation 830 along the principles outlined above with respect to FIG. 4.

Further, one could even assume a scenario where a current access point may not communicate with the new access point. Then, the mobile station would be informed not to perform handover to the new access point due to security reasons. The network administrator will then be informed about the new access point, and subsequent hereto the security context information will be sent to these new access points assuming operation as outlined above.

IntraDomain Handover—Case IV

Figure 9:
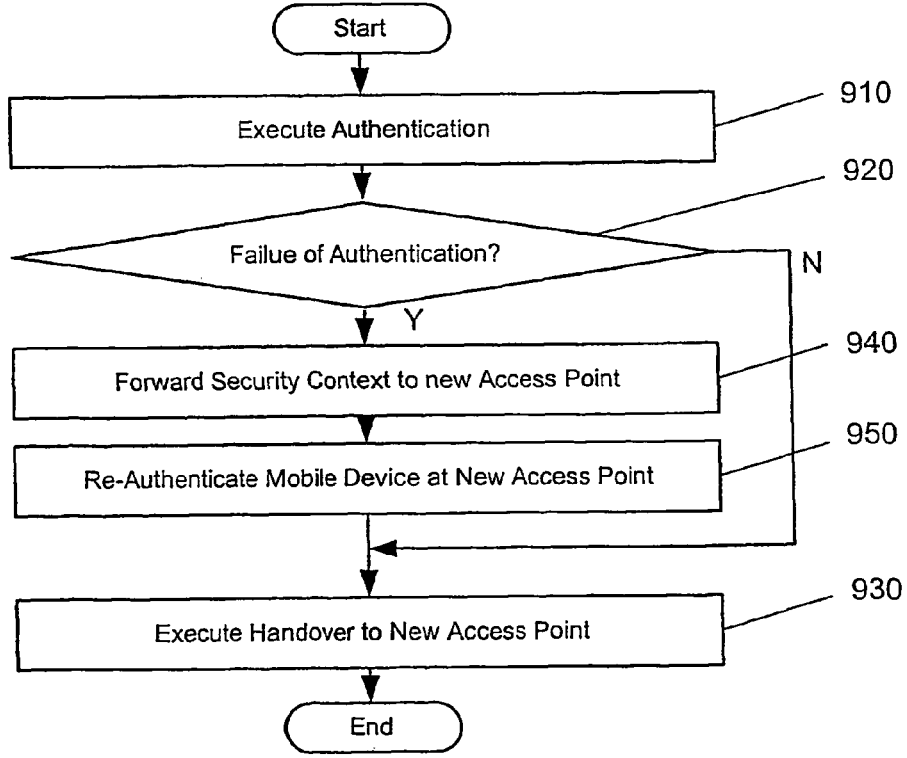
FIG. 9 shows a flowchart of operation for a fourth type of intra-domain handover according to the present invention.

A further non-binding example of intra-domain handover illustrated with respect to FIG. 9 showing a flowchart of operation for this type of intra-domain handover is again related to a situation where the security context information is not available at the new access point. The condition for a handover here is that the mobile station will perform handover without informing the current access point thereon.

As shown in FIG. 9, for this type of intra-domain handover, initially there will be executed an authentication between a mobile station and the new access point in operation 910. After interrogation on failure of authentication in operation 920, handover will be executed to the new access point if the authentication has been successful in operation 930. Otherwise, security context information will be forwarded to the new access point in operation 940 for re-authentication of the mobile station at the new access point in operation 950, followed by execution of handover to a new access point according to operation 930.

From the above, it should be clear that according to the present invention the protocol security level is brought to the elements of encryption algorithm and related levels. Users are prevented from intervening/anticipating on the total process and key generation, thus preventing handover to rogue elements/access points. Although increased security levels are achieved, this causes only minimized delay during handover irrespective of intra- or inter-domain handover, while at the same time maintaining security level.

InterDomain Handover

While above specific examples of intra-domain handover have been explained with respect to FIGS. 6-9, in the following, particulars of inter-domain handover will be explained with respect to FIGS. 10-14.

As for the intra-domain handoer, also for the inter-domain handover the object is a seamless, secure, fast handover across communication domain boundaries without disruption of on-going services.

Figure 10:
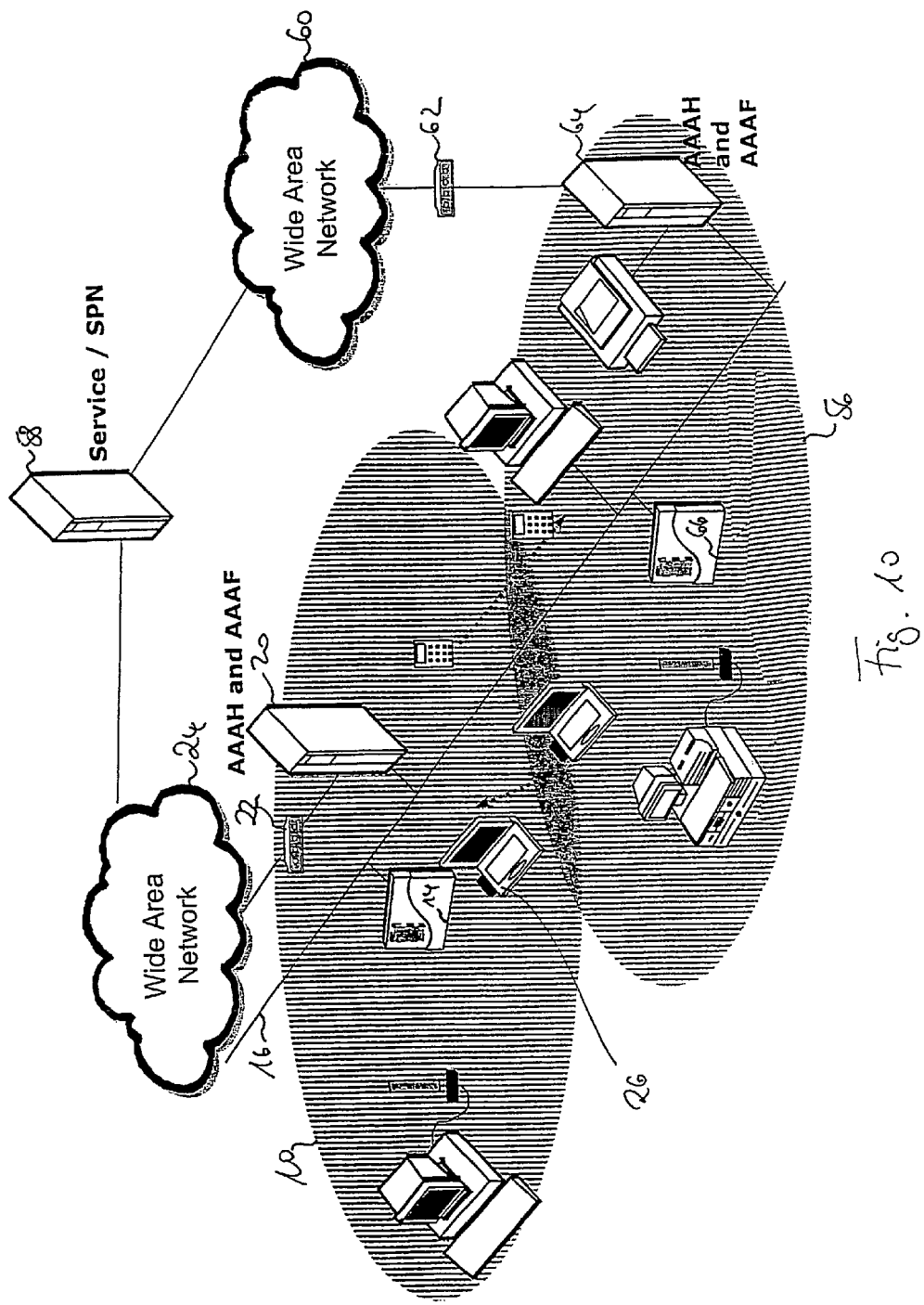
FIG. 10 shows an overview illustrating a typical example of an inter-domain handover according to the present invention.

Heretofore, FIG. 10 shows an overview illustrating a typical example of inter-domain handover.

As shown in FIG. 10, further to the first communication network domain 10 and a related attached wired area network 24, during inter-domain handover there may be involved a second communication network domain 56, a service provider network, content provider network 58, and a further wired area network 60 connected via a router 62 to an authentication server 64 of the second communication domain 56.

FIG. 10 also shows that an access point 66 is as well provided for the second communication network and that the backbone network 16 allows for coupling of network elements at least in the first communication network and the second communication network.

It should be noted that the specific network set-up shown in FIG. 10 is illustrated only, and should not be considered as restricting scope of the present invention. Although wireless local area networks WALN are used to explain typical application scenarios of the present invention, it should be clear that all related ideas may as well be used for any other type of mobile communication system, i.e. a mobile communication telephone network of the second generation, a mobile communication telephone network of the second generation, a mobile communication telephone network of the third generation, and/or any hybrid form, etc.

Further, regarding handover between different types of networks, one may differ between a current network CN or equivalently a current communication domain, further a new network or a new communication domain NN, and a home network or a home communication domain HN. In addition, there may be involved a service provider network SPN and a content provider network CPN.

Between all these networks, one may differentiate whether there exists a trust relation, i.e. whether the communication between the related networks is considered to be protected and safe. Otherwise, if a trust relation is requested, appropriate measures have to be taken before set-up of communication to assure that no fraud on communication during data exchange between the two networks may occur.

Also, assuming that the home network HN has a trust relation to a current network CN, and further the current network CN has a trust relation to a new network NN, then the trust relation between the home network HN and the current network CN and the current network CN and the new network NN may be delegated for a communication between the home network HN and the new network NN.

A basic scenario for domain handover is a handover from the current network, where the current network is the home network to a new network. Here, the new network NN may have a prior trust relation with the current network CN or may not have a trust relation with the current network.

Should there be a trust relation between the current network and the new network, then the application points of the new network become a part of the multi-cast domain of the current network and vice versa. It is not necessary that the current network transfers all security context information to the new network, e.g., it is not necessary to send the master key or the communication key. The access points of the current network CN are informed at their wake-up about the trust-relations with different networks in the neighbourhood and this information is updated periodically by the authentication server. If the information is not updated within a specific time out period TO-TRUST, then the access points may contact the authentication server requesting an update.

In other words, also for inter-domain handover there is maintained a security context information and this time exchanged between the current network CN and the new network NN, e.g., by sending it to the access point in the neighbourhood graph of the current access point.

Here, further to the intra-domain handover scenario outlined above, some of the security context information is dependent of the type or extent of trust relation between the current network CN and the new network NN.

Typically, the security context information comprises at least:
- encryption algorithms being used for the mobile station;
- encryption algorithms of the mobile station support;
- master key, transfer of which is dependent of the level of trust relation between different networks;
- time out period for a master key TO-MK;
- roaming key RK;
- time out period for roaming key TO-RK;
- communication key ASK; this communication key is sent only if the communication key ASK is not derived every time during handover;
- further, the transfer of the communication key ASK is dependent of the level of trust relation between the current network and the new network;
- time out period for the communication key TO-ASK;
- security context information time out period TO-CI;
- a time stamp;
- an identification of the access point;
- an identification of the mobile station; this identification may include the MAC address or the IP address, and further a temporary ID as used in UMTS may also be generated from known ID, e.g., during the first log-in procedure; and
- identification of the current network.

Further, as outlined above with respect to the intra-domain handover, also for the inter-domain handover the time out period of the roaming key and the communication key may be extended in the new communication domain for initial communication between the mobile device and related network elements, if necessary.

Further to the security context information, for inter-domain handover, also security information is sent to the mobile station, when the handover takes place from a current network CN to a new network NN to facilitate smooth handover.

In particular, this security information is provided to get the mobile station ready for the new network, irrespective of whether additional communication related information is exchanged between related access points or not.

Heretofore, the contents of the security information provided to the mobile station comprises at least:
- the identification of the new network;
- an IP address of a foreign agent in the new network, which is preferably provided if mobile IPv4 is used;
- an IP address previously obtained from the new network via the current network and being dependent of the kind of network being used and, e.g., the version of Internet protocol IP being used for the example of WLAN: this might not be required if MIP is used;
- the encryption key: this is the new communication key for the mobile station and the new access point in the new network; the encryption key is included in the security information when the communication key is not sent via the current access point to the new access point in the new network; otherwise, the encryption key is included in the security information;
    - (i) when the communication key ASK is not sent by the current access point to the new access point in the new network;
    - (ii) the master key MK is not sent to the new access point in the new network, but the communication key ASK is, and further when the communication key ASK will time out before a new master key MK can be created in the new network; when the master key MK is not sent to the new network and the mobile station cannot derive a new communication key ASK or will derive a wrong communication key ASK on the basis of the old master key; therefore, the new communication key ASK is sent by the new access point in the new network if the following condition holds:

$$\text{time out} \geq \text{ASK or RK, left} \geq \text{T-MK}$$

where TO-ASK or RK, left, is the time left for the communication key ASK or the roaming key RK; i.e. after expiry of this time, the communication key ASK will time out and will become invalid; further, T-MK is the time required to create a new master key by the mobile station and the authorization server in the new network. It is also possible that the communication key is not transferred by the current network to the new network or by the new network to the current network.
- time out period for the encryption key;
- the encryption algorithm: it is possible that the access points in the new network use different encryption algorithms compared to those used in the current network. In such a case, the current access point can choose the best term and encryption algorithm being used by the mobile station and the new access point and let the mobile station know about this. The best possible encryption algorithm can be chosen based on the policy of the mobile station and that used in the new network. The new network can always control after handover, assuring that the current network has done the job as required, i.e. chosen an encryption algorithm based on the implementation policy. As the new access point in the new network knows the encryption algorithms that the mobile station supports, it can inform the current access point of the encryption algorithm of choice.

InterDomain—Preparatory Set-up

The different application scenarios with respect to inter-domain handover which will be explained herein below are based on the following non-binding assumptions:
- the communication between network elements is secure;
- for IEEE 802.11 WLAN it is assumed that the inter-access point protocol provides secure communication between access points;
- log-in or initial authentication of the mobile device is user-secure in case of IEEE 802.11 WLAN it is the mobile station;
- the authentication server and the network element through which the mobile device authenticates itself or log-on have a secure connection; the inter-access point protocol provides a secure connection between the authentication server and the access points;
- the authentication servers between different communication domains or networks have trust relation, which depends on the handover situation being discussed as outlined above;

the networks themselves are service providers or services being provided by a third party content provider which has a trust relationship with all current network domains.

Figure 11:
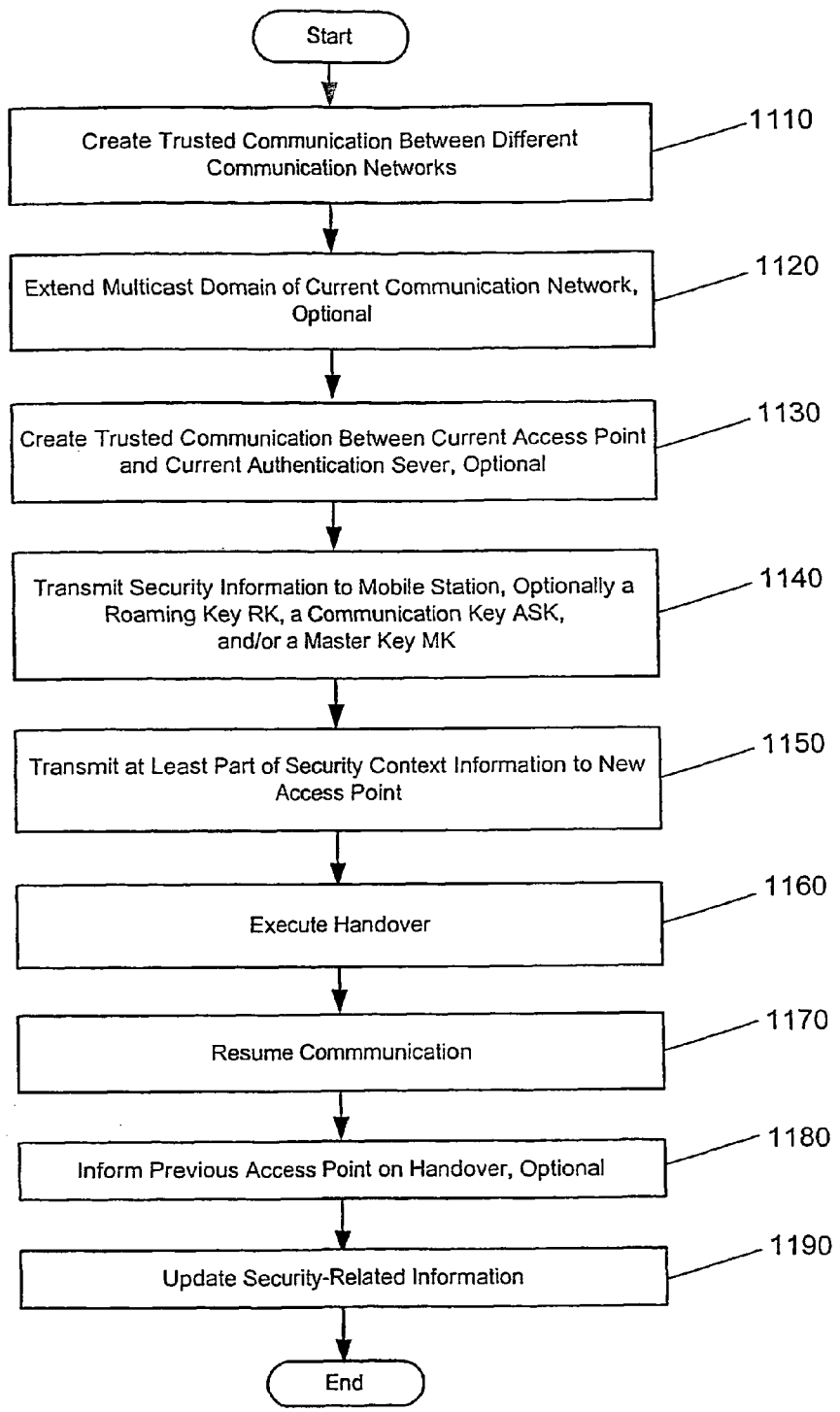
FIG. 11 shows a flowchart of operation in preparing for an inter-domain handover according to the present invention.

FIG. 11 shows a flowchart of operation preparing for an inter-domain handover according to the present invention.

Initially, in an operation 1110 it is taken care of that a trust communication between communication networks is available. Then, in an operation 1120 the multi-cast domain of the current communication network, in particular the current access point is extended, which step is optional. Then, in an operation 1130 there is created a trust communication between the current access point and the current authentication server, which operation is also optional.

As shown in FIG. 11, in preparing for inter-domain handover, in an operation 1140 there is transmitted security information as outlined above to the mobile station, and optionally also a roaming key RK, a communication key ASK and/or a master key MK.

As shown in FIG. 11, besides the security information being provided with respect to the mobile station, there is also transmitted at least part of a security context information with respect to access points to the new access point in an operation 1150.

As shown in FIG. 11, then follows an operation 1160 to execute handover and an operation 1170 to resume communication.

As shown in FIG. 11, optionally in an operation 1180 the previous access point is informed on handover. In an operation 1190 all access points in the neighbourhood of the new access point are updated regarding the security-related information, in particular the security context information.

InterDomain—Basic Handover

In the following, details of the operation 1160 to execute handover as shown in FIG. 11 will be explained with respect to basic handover procedure for handover from a current network to a new network, assuming trust communication links have been established as outlined previously and that security information has been downloaded to the mobile device, see FIG. 11.

Generally, according to the basic handover procedure, when the handover is performed, mutual authentication is done between the mobile station and the new access point, where preferably the roaming key is used for this purpose. Here, any of the known mutual authentication methods may be used.

Once the mutual authentication is performed, the communication can continue and be resumed because context information for the mobile station is available with the new access point. Therefore, the basic handover procedure is similar to that explained above with respect to intra-domain handover according to FIG. 4.

Should the communication key not be communicated to the new access in the new network or by the new access point to the mobile station, then the communication at the beginning takes place using the roaming key RK.

Further, the new access point sends the context information to all access points in its neighbourhood relation graph. The new access point will inform the related authentication server in the new network on the handover procedure, and the authentication server in the new network will again inform the authentication server in the current network.

Further, the mobile station and the new authentication server will create a new master key before the currently used communication key ASK and the roaming key are timed out. Here, it should be noted that this is done only if the master key is not sent from the current network to the new network.

Further, the mobile station and the new access point will create a communication key ASK. If there is no communication key ASK and the roaming key RK is used for communication, a new communication key ASK will be created only after expiry of the previous one.

In view of the above, it becomes clear that when the mobile station roams from the current network to the new network, initially the roaming key and the security information will be used for the mobile station 'to get started' or, in other words, for preliminary communication.

Therefore, the roaming key must have a life time long enough for generation of a master key in the new network. The same also applies to the communication key ASK if this key is sent from the current to the new network.

Once a master key has been created in the new network, this allows to create related communication keys ASK and a roaming key RK also in the new network for subsequent further handovers in the sense outlined above. The related created communication key and roaming key will be incorporated into the security context information for subsequent update of access points in the new network being part of the neighbourhood relationship of the currently activated new access point.

In the following, it will be explained how the basic handover procedure from the current network to the new network will be applied to different constellations, i.e. a constellation where the current network and the new network have a trust relationship or not.

InterDomain—Case I

A first such relationship is a case where the current network and the new network have a trust relationship. A related flowchart of operation for this type of inter-domain handover is shown in FIG. 12.

Figure 12:
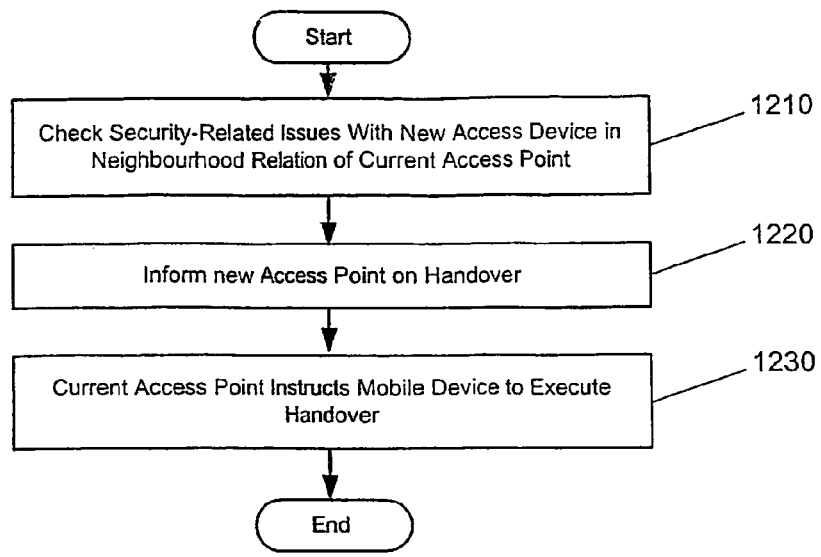
FIG. 12 shows a flowchart of operation for a first type of inter-domain handover according to the present invention.

As shown in FIG. 12, it is assumed that the handover is achieved to the new network with trust relationship and that the new access point is identified in the neighbourhood relationship with respect to the current access point, i.e. that the security context information is transferred to this new access point, operation 1210.

Here, the conditions for handover are that the handover is performed either with the mobile station informing the current access point of the new access point or that the current access point, judging from criteria like communication quality, informs the mobile station of the new access point. Further, another criterion is that the mobile station will perform handover only after all the communication between the current and the new access point is completed.

As shown in FIG. 12, prior to handover, the new access point will be informed on handover and the same also applies to the mobile station, operation 1220.

As shown in FIG. 12, what follows is the execution of the handover itself through the current access point instructing the mobile device to execute handover, operation 1230.

Inter Domain—Case II

Figure 13:
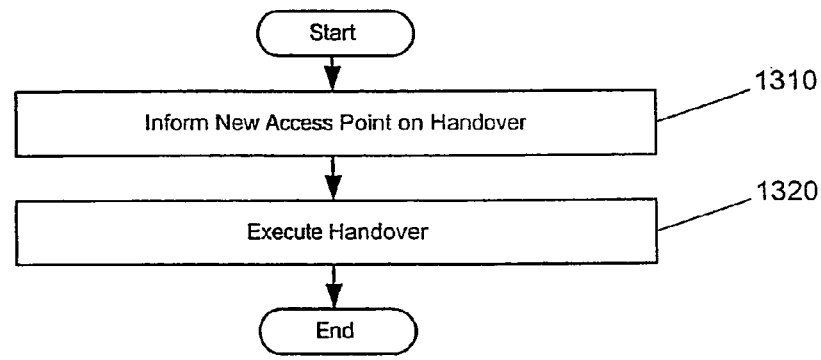
FIG. 13 shows a flowchart of operation for a second type of inter-domain handover according to the present invention.

A further type of inter-domain handover is illustrated with respect to FIG. 13.

Here, it is assumed that handover is achieved, e.g., from an access point in the current network to a new network which both have a trust relationship.

As shown in FIG. 13, here the condition for handover is that only the new access point is informed on handover, operation 1310, and that subsequent hereto the handover is executed, operation 1320, without informing the new access point.

Inter Domain—Case III

Further handover situations and procedures are related to a current network and a new network not having trust relationships. A related type of handover is illustrated in FIG. 14.

In the case where the current network and the new network do not have a trust relationship with each other and the mobile station requests for handover to the new network or has handed over to the new network, there arises the option that the handover to the access point in the new network occurs either with the current access point being informed or with the current access point not being informed.

Figure 14:
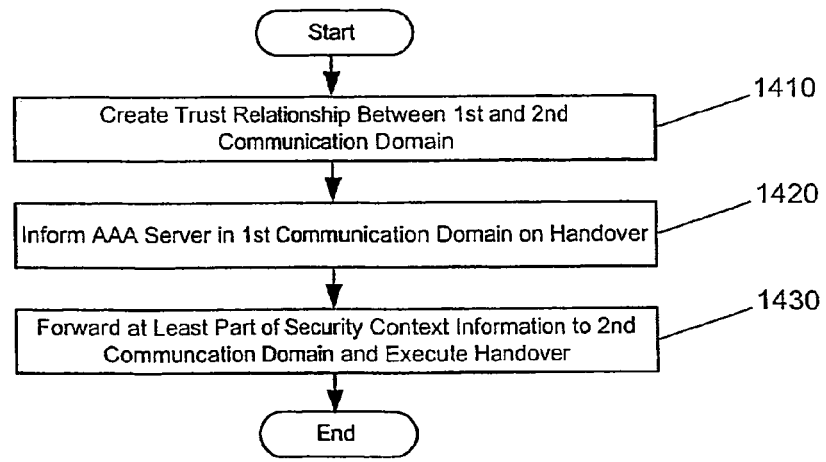
FIG. 14 shows a flowchart of operation for a third type of inter-domain according to the present invention.

In the first case, the current access point being informed means that the handover takes place after the current access point has taken care of all necessary procedures, as shown in FIG. 14.

Heretofore, a first operation 1410 is the creation of a trust relationship between the first and the second network. Therefore, the current access point contacts the authentication server and informs about the requested handover, the authentication server and the current network then contact the authentication server in the new network and create a trust relation, operations 1410, 1420.

Then, the security context information is transferred to the new access point in the new network, operation 1430, and the handover procedure is the same as the basic handover procedure outlined above.

Here, it should be noted that due to the delay in communication between the current network and the new network, it is possible that the mobile station performs handover before the trust relationship is created between the current network and the new network.

Assuming that the current access point is not informed, the mobile station will move to the new access point without informing the current access point. The communication will be broken and re-established in the current communication network, i.e. using a authentication server progress solution or a similar approach to resume communication as before the handover.

Up to now, inter-domain handover situations have been discussed with respect to basic procedure, a situation where the current network and the new network have trust, and further a situation where the current network and the new network do not have trust.

Further to this, handover situations and procedures may be classified from the type of the current network and the new network, i.e. whether the current network is the home network or not, and also whether the new network is the home network or not, and further with respect to the trust relationship between the new network and the home network.

Heretofore, there is a situation when a mobile station performs handover from a new network, which is not its home network, to another new network, which is also not its home network. Here, it should be noted that the authentication server in the home network should be informed anyway on the handover procedure.

A first case is related to the current network and the new network having a trust relationship. In this case, even if the new network does not have a trust relationship with the home network, trust can be delegated from the current network to the new network. Besides the trust delegation part, the handover procedure is the same as outlined above with respect to FIGS. 12 and 13.

A second situation arises when the current network and the new network do not have a trust relationship, considering that the new network does not have a trust relationship with the home network, either. This means that trust between the home network and the new network must be created somehow according to procedures as outlined in FIG. 14.

A third situation arises when the new network has a trust relationship with the home network. Here, if the current network also has a trust relationship with the new network, then simply the trust relationship should be checked and the procedure according to FIGS. 12 and 13 should be followed.

Otherwise, if the current network does not even have a trust relationship with the new network, then the current network will check if the home network has a trust relationship with the new network. Here, the home network may delegate trust, and the procedures as outlined with respect to FIGS. 12 and 13 should be followed.

Finally, another handover situation occurs when the new network is the home network or, in other words, when a mobile station is roaming back to the home network. Here, usually there should be trust relationship between the current network and the new network being the home network, so that the procedures as outlined above and with respect to FIGS. 12 and 13 should be followed.

The invention claimed is:

1. A method of secure handover in a distributed mobile communication environment, wherein the secure handover is executed for a mobile device between a current access device and a new access device, comprising:

generating a master secret authentication value during log-on of the mobile device with an authentication server;

receiving the master secret authentication value after log-on of the mobile device with the authentication server at the current access device;

deriving a roaming authentication value for mutual authentication between the mobile device and the new access device from the master secret authentication value at the current access device, wherein the new access device is identified in a neighborhood relation of the current access device;

forwarding security context information comprising at least the master secret authentication value and the roaming authentication value for mutual authentication between the mobile device and the new access device to the new access device from the current access device to the new access device;

executing a mutual authentication between the mobile device and the new access device using the roaming authentication value comprised in the security context information;

executing a handover from the current access device to the new access device when the executing a handover from the current access device to the new access device when the mutual authentication is successful, the handover being executed between access devices of different communication domains, wherein the current access device is operated in a current communication domain and the new access device is operated in a new communication domain;

transmitting security information with respect to the new communication domain from the current access device to the mobile device, wherein the security information comprises at least one item of:

an identification of the new communication domain;

a new communication authentication value for mutual communication between the mobile device and the new access device in the new communication domain, when the current communication authentication value for mutual communication between the mobile device and the current access device in the current communication domain is not communicated to the new communication domain;

a time out period for the new communication authentication value for mutual communication between the mobile device and the new access device in the new communication domain; and an encryption algorithm to be used in the new communication domain.

2. A method according to claim 1, further comprising receiving a master secret authentication value for the user authentication from the new communication domain at the mobile device, when the current communication domain and the new communication domain use different authentication mechanisms.

3. A method according to claim 1, characterized in that mutual authentication between the new access device and the mobile device is achieved using the roaming authentication value for mutual authentication.

4. A method according to claim 1, further comprising forwarding at least part of security context information to the new communication domain, wherein the security context information further comprises at least one of:

a communication authentication value for mutual communication between the mobile device and the current/new access device;

an indication of type of encryption being used by the mobile device;

an indication of type of encryption being supported by the mobile device;

a time out period for the master secret authentication value;

a time out period for the communication authentication value for mutual communication between the mobile device and the current access device;

a time out period for the roaming authentication value for mutual authentication between the mobile device and the new access device;

a time out period for the security context information;

a time stamp;

an identification of the mobile device;

an identification of the current access device; and an identification of the first communication domain.

5. An access device for executing secure handover in a distributed mobile communication environment, wherein the secure handover is executed for a mobile device between a current access device and a new access device, comprising:

an encryption key unit adapted to generate a master secret authentication value in cooperation with an authentication server during log-on of the mobile device at the authentication server and adapted to generate a roaming authentication value for mutual authentication between the mobile device and the new access device from the master secret authentication value;

a communication unit adapted to forward security context information comprising at least the master secret authentication value and the roaming authentication value for mutual authentication between the mobile device and the new access device to the new access device, wherein the new access device is identified in a neighborhood relation of the current access device;

an authentication unit adapted to execute a mutual authentication between the mobile device and the new access device using the roaming authentication value for mutual authentication between the mobile device and the new access device;

a handover control unit adapted to execute a handover from the current access device to the new access device when the mutual authentication is successful;

wherein the handover control unit is adapted to execute handover between access devices of different communication domains, wherein the access device is operated in a current communication domain and the target access device is operated in a new communication domain and the communication unit is adapted to create a trusted communication between an authentication server of the current communication domain and at least one handover target access device in the new communication domain; and wherein the communication unit is adapted to transmit security information with respect to the new communication domain to the mobile device, wherein the security information comprises a least one item of:

an identification of the new communication domain;

optionally, a care-of-address of a foreign agent in the new communication domain;

a new communication authentication value for mutual communication between the mobile device and the new access device in the new communication domain, when the current communication authentication value for mutual communication between the mobile device and the current access device in the current communication domain is not communicated to the new communication domain;

a time out period for the new communication authentication value for mutual communication between the mobile device and the new access device in the new communication domain; and an encryption algorithm to be used in the new communication domain.

6. An access device according claim 5, characterized in that the authentication unit is adapted to achieve mutual authentication between the access device and the mobile device in the new communication domain using the roaming authentication value.

7. An access device according to claim 5, characterized in that the communication unit is adapted to forward at least part of security context information to the new communication domain, wherein the security context information comprises at least one of:

a roaming authentication value for mutual authentication between the mobile device and the current/new access device;

a communication authentication value for mutual communication between the mobile device and the current/new access device;

an indication of type of encryption being used by the mobile device;

an indication of type of encryption being supported by the mobile device;

a time out period for the master secret authentication value;

a time out period for the communication authentication value for mutual communication between the mobile device and the current access device;

a time out period for the roaming authentication value for mutual authentication between the mobile device and the new access device;

a time out period for the security context information;

a time stamp;

an identification of the mobile device;

an identification of the current access device; and an identification of the current communication domain.

8. A mobile device for executing secure handover in a distributed mobile communication environment, wherein the secure handover is executed between a current access device in a current communication domain and a new access device in a new communication domain, wherein the new access device is identified in a neighborhood relation of the current access device, comprising:
- a communication unit adapted to receive a roaming authentication value derived from a master secret authentication value for mutual authentication between the mobile device and the new access device from the current access point;
- an authentication unit adapted to execute a mutual authentication between the mobile device and the new access device using the roaming authentication value; and
- a handover control unit adapted to execute a handover from the current access device to the new access device when the mutual authentication is successful;
- wherein the communication unit is adapted to receive security information with respect to the new communication domain, wherein the security information comprises at least one item of:
- an identification of the new communication domain
- optionally, a care-of-address of a foreign agent in the new communication domain;
- a new communication authentication value for mutual communication between the mobile device and the new access device in the new communication domain, when the current communication authentication value for mutual communication between the mobile device and the current access device in the current communication domain is not communicated to the new communication domain and/or a master secret authentication value used in the current communication domain is not communicated to the new communication domain and the current communication authentication value for mutual communication between the mobile device and the current access device in the current communication domain will lime out before creation of a new master secret authentication value used in the new communication domain;
- a time out period for the new communication authentication value for mutual communication between the mobile device and the new access device in the new communication domain; and
- an encryption algorithm to be used in the new communication domain.

* * * * *